United States Patent [19] [11] 3,706,361
Paulssen et al. [45] Dec. 19, 1972

[54] SAFETY BRAKE

[72] Inventors: Walter A. Paulssen, Spring Lake; Robert R. Johnston, Muskegon, both of Mich.

[73] Assignee: Dresser Industries, Inc., Dallas, Tex.

[22] Filed: July 21, 1970

[21] Appl. No.: 56,793

[52] U.S. Cl. ................................ 188/189, 188/44
[51] Int. Cl. ........................... F16d 59/00, B60t 8/12
[58] Field of Search ...188/188, 189, 44, 136; 187/89

[56] References Cited

UNITED STATES PATENTS

| | | | |
|---|---|---|---|
| 1,165,583 | 12/1915 | Farmer | 188/189 |
| 2,931,466 | 4/1960 | Allenbaugh | 188/188 |
| 3,215,231 | 11/1965 | Lodige | 188/189 |
| 3,273,671 | 9/1966 | Vrana | 188/188 X |

Primary Examiner—Duane A. Reger
Attorney—Robert W. Mayer, Thomas P. Hubbard, Jr., Daniel Rubin, Raymond T. Majesko, Royl Van Winkle, William E. Johnson, Jr. and Eddie E. Scott

[57] ABSTRACT

A safety brake operable in the event of a support failure between contiguous load carrying component parts of elevating equipment such as the mast of a stacker crane in which the parts are normally supported one dependent on the other. Tapered brake shoes secured spaced apart on one of the component parts are normally held disengaged from a gripping bar vertically extending therebetween and secured to the other component part. In the event of failure in the normally connecting support structure, brake operation is triggered by an associated velocity-sensitive actuator enabling the shoes to be wedgedly forced into brake engagement with the gripping bar.

17 Claims, 7 Drawing Figures

INVENTORS
WALTER A. PAULSSEN
ROBERT R. JOHNSTON

ATTORNEY

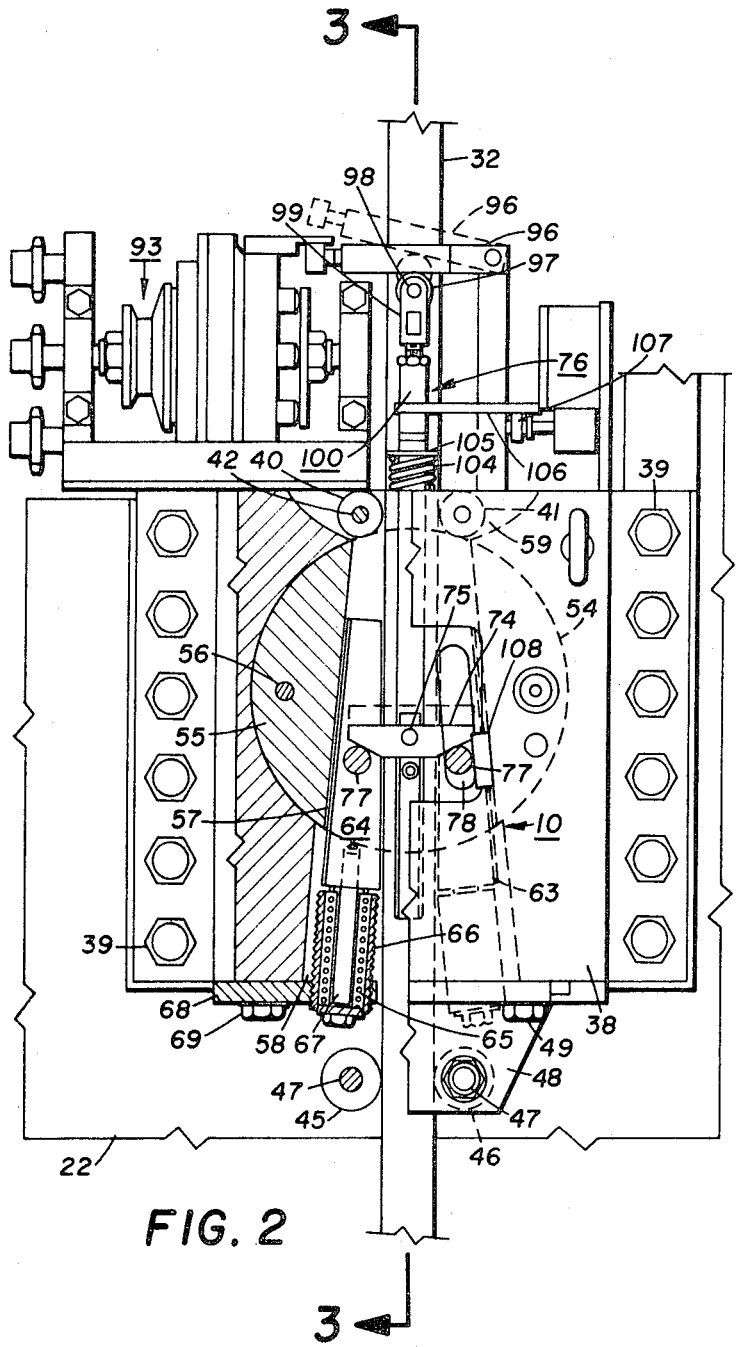
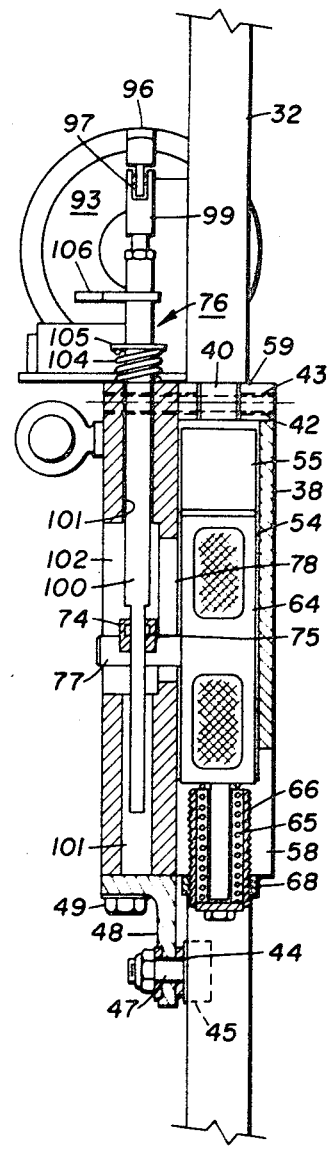
FIG. 2
FIG. 3
INVENTORS
WALTER A. PAULSSEN
ROBERT R. JOHNSTON
ATTORNEY

INVENTORS
WALTER A. PAULSSEN
ROBERT R. JOHNSTON

ATTORNEY

SAFETY BRAKE

CROSS-REFERENCE TO RELATED APPLICATIONS

Application entitled, "Centrifugal Actuator" cofiled herewith in the name of Walter A. Paulssen and incorporated herein by reference.

BACKGROUND OF THE INVENTION

1. The field of art to which the invention pertains includes the art of brakes and catches for elevating structures as for example contained in Patent Office Class 187, sub-class 73.

2. It is common on most elevating structures to provide a form of catch or safety brake to prevent runaway descent in the event of failure occurring in the normal support structure. While operation of such brakes is generally infrequent, they are nonetheless essential for safety if not absolutely required in order to conform with many national and local safety codes governing construction of such devices. Despite these brakes possibly going unused for years at a time, dependable operation is expected when the need arises to avoid property damage and/or personal injury which could otherwise occur. Like most safety devices intended to operate only in rare but sudden emergencies, some form of associated maintenance program is usually required to insure operability when the occasion arises.

In the field of material handling, it is usual to employ elevating type load carrying equipment such as stacker cranes, fork lifts, or the like by which substantial loads are relocated while elevated off the ground or floor. Whereas this type of equipment is usually marketed with a safety brake to prevent load dropping with the consequent results in the event of equipment support failure, it has been found that much of this equipment incurs such violent owner service abuse and/or lack of proper maintenance that the brake fails to function properly when the occasion of emergency arises. Not only does the physical damage occur which had the brake operated satisfactorily would have been avoided, but it is the equipment manufacturer who is frequently looked to for liability in connection with failure of the brake to operate properly. Notwithstanding the manufacturer's exercise of all reasonable precautions in the form of a well constructed brake device, accompanied by recommended maintenance instructions and the like, the manufacturer without having any after-sale control over either maintenance or abuse to which the equipment is subjected, is still called to account when the brake fails to operate. It can be appreciated therefore that such a situation presents a serious legal dilemma for the equipment manufacturer.

SUMMARY

This invention relates to a safety brake for use with elevating equipment in the field of material handling. More specifically, the invention relates to a safety brake for elevating equipment such as stacker cranes, fork lifts, or the like and operable in conjunction with a velocity sensitive actuator to brake a relative descent which would otherwise occur between component parts in the event of failure in the normal support. The brake in accordance herewith is constructed to include a body enclosing a pair of spring biased, tapered brake shoes secured relatively spaced apart on one of the components. The shoes are normally held by an actuator disengaged in brake release relation from a gripping bar which extends vertically between them and is secured to the other component. In the event of failure in the normal equipment support structure, the brake is operatively triggered by the associated actuating mechanism for the shoes to wedgedly grip the bar and arrest any descending movement. By virtue of the close interfit and relative linear movement between the shoes and gripping bar, cantilevered loads on the actuated brake are avoided. Jacketing the non-gripping shoes surfaces with a relatively friction-free material, eliminates or minimizes need for lubrication therebetween as would otherwise be required. With this construction therefore, operating parts are kept to a minimum and are enclosed generally well protected against service abuse while at the same time, minimizing maintenance requirements. Not only therefore is the brake hereof less costly to manufacture than similar purpose devices of the prior art but its operative arrangement enhances dependability on the occasion of its need for safety notwithstanding relative infrequency of its use.

It is therefore an object of the invention to provide a novel safety brake for use with load carrying elevating equipment.

It is a further object of the invention to provide a novel safety brake for load carrying elevating equipment in the material handling field in which the equipment is comprised of contiguous component parts normally supported and movable one dependent on the other.

It is further object of the invention to provide a safety brake as in the aforesaid object which is of increased simplicity in construction and yet affording increased operational dependability than similar purpose brakes of the prior art.

It is still another object of the invention to provide a novel safety brake as in the last-recited object and which is less likely to incur service abuse and generally requiring reduced maintenance as compared to similar purpose safety brakes of the prior art.

BRIEF DESCRIPTION OF THE DRAWINGS

FIG. 2 is a plan view partially in section of a safety brake in accordance herewith;

FIG. 3 is a sectional view taken substantially along the lines 3—3 of FIG. 2;

Figure 1:
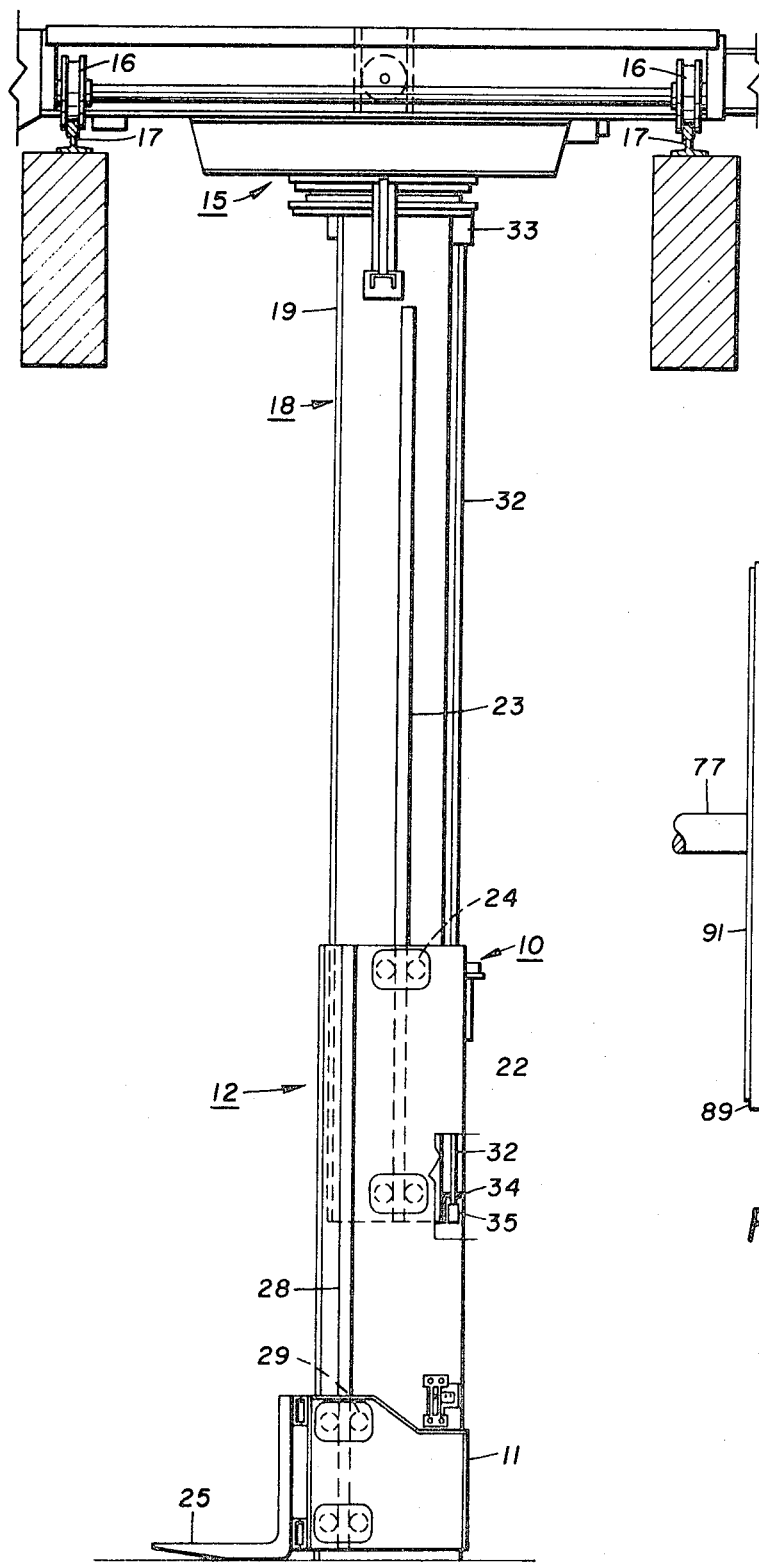
FIG. 1 illustrates a typical stacker crane on which the invention hereof is incorporated.

Referring now to the drawings and particularly to FIG. 1, the brake mechanism hereof is designated 10 and is shown for purposes of disclosure mounted onto a stacker crane 12 which can comprise a type disclosed for example in Deligt U.S. Pat. No. 3,250,402 incorporated herein by reference. The crane briefly comprises a trolley assembly indicated at 15 including a plurality of wheels 16 for riding along a pair of parallel rails 17 suitably supported within the facility to be served by the crane. Depending from the carriage is a mast assembly 18 comprising a fixed mast section 19 supported and secured vertically relative to trolley 15. Telescopically arranged over fixed mast section 19 is an intermediate mast section 22 guided for movement by means of elongated rails 23 secured extending longitudinally along opposite vertical sides of fixed mast 19. A plurality of rollers 24, carried by the intermediate mast, engage opposite sides of each rail 23 to provide rolling movement of section 22 relative to section 19. Telescopically mounted for elevating movement near the lower end of section 22 is a load engaging section 11 including laterally extending forks 25 on which load is to be carried. Vertical rail 28 secured on section 22 and engaged by rollers 29 guides vertical movement of section 11.

The driving force for elevating the components is effected via cables (not shown) from a hoist assembly on trolley 15. Under normal conditions of operation, relative elevation of forks 25 can be readily adjusted by application of power on the hoisting unit and when power is disconnected elevations of the respective components are fixedly maintained.

Reference is now additionally made to FIGS. 2–7 for an understanding of the brake structure in accordance herewith. As between the fixed and movable mast sections 19 and 22 respectively one, preferably the former, includes a vertically extending laterally floating brake gripping bar 32 secured to mast 19 at its upper end via shock absorbing support 33. At its lower end 19 bar 32 extends loosely through a bifurcated bracket 34 and at the underside slightly below the bracket has a pair of lugs 35 attached thereto. This permits a degree of limited lateral and vertical bar movement and in conjunction with shock absorber 33, the impact of sudden braking will be cushioned to minimize any possible shock imposed on the crane structure at the time braking is initiated.

On the other mast, in this instance intermediate movable section 22, are secured the actuating components of brake mechanism 10 and including a body 38 providing the basic support and enclosure therefor. Body 38 is milled and slotted to generally enclose and accommodate the working components and is securely mounted to intermediate mast 22 via a plurality of bolts 39. In its mounted position the body is located centrally straddling gripping bar 32 which vertically extends through the mid-section thereof. Maintaining the body laterally situated in the foregoing relation with respect to the gripping bar are a pair of upper guide rolls 40 and 41 and lower guide rolls 45 and 46. Each of the guide rolls is rotatably supported on upper and lower cross pins 42 and 47 respectively. The pins are in turn press fit respectively into lateral apertures 43 of the body and 44 of L-shaped underbracket 48 secured to the underside of body 38 via a pair of bolts 49.

Centrally defined within body 38 is a circular cavity 54 in which is contained a disc-like brake shoe holder 55 secured to the body by means of bolts 56. Formed extending vertically through the shoe holder is an upwardly narrowing tapered center passage 57 symmetrically arranged with respect to gripping bar 32. Openly communicating with passage 57 at its lower end is a tapered lower body passage 58 and communicating at its upper end is an upper body passage 59 containing the rollers 41 and 42. Received overextending between passages 57 and 58 arranged opposite hand on each side of bar 32 are a pair of brake shoes 63 and 64 adapted for vertical movement into and out of braking relation with gripping bar 32.

Associated with each shoe tending to urge it upward into braking engagement against bar 32 is a compressed spring 65 of relatively high spring rate coiled about pin 67. Each spring at its upper end engages the underside of its associated brake shoe and at its lower end engages the bottom of cylindrical cage support 66. Support 66 is in turn threadedly secured in a plate bracket 68 mounted to the underside of body 38 via volts 69.

Figure 6:
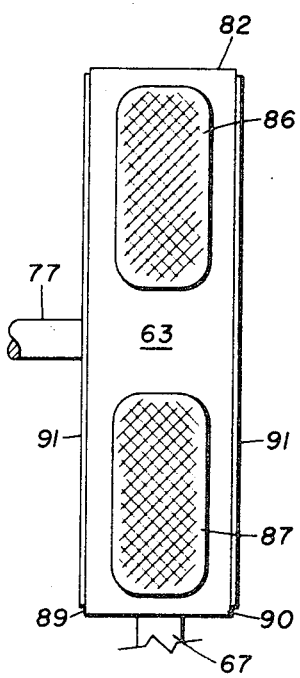
FIG. 6 is an elevation view of a brake shoe as viewed from the position 6—6 of FIG. 4.
Figure 4:
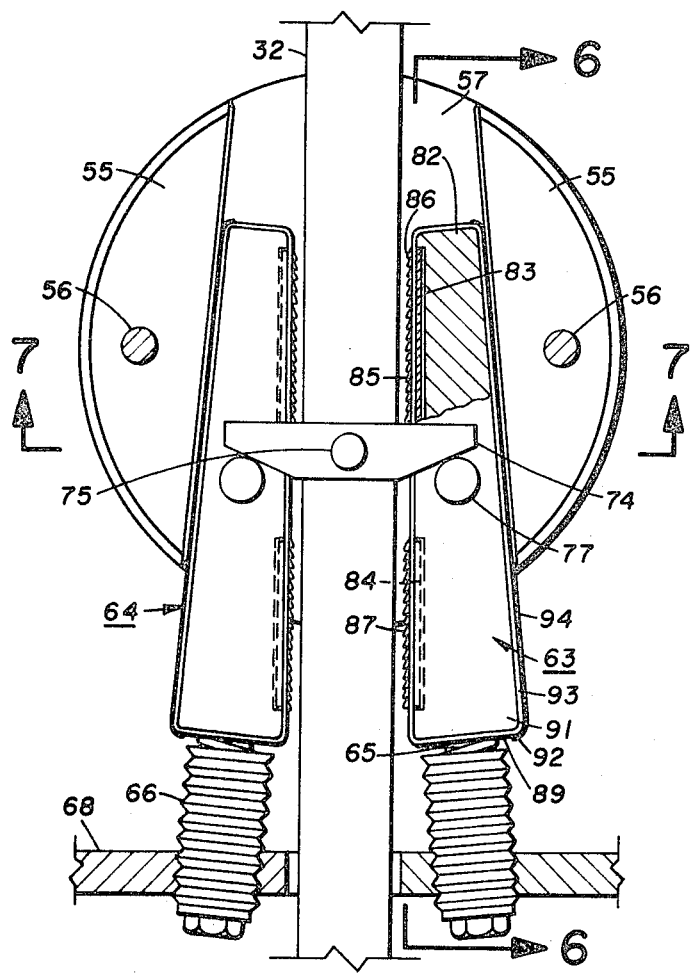
FIG. 4 is an enlarged sectional plan of the brake showing the shoes thereof in brake open relation.
Figure 5:
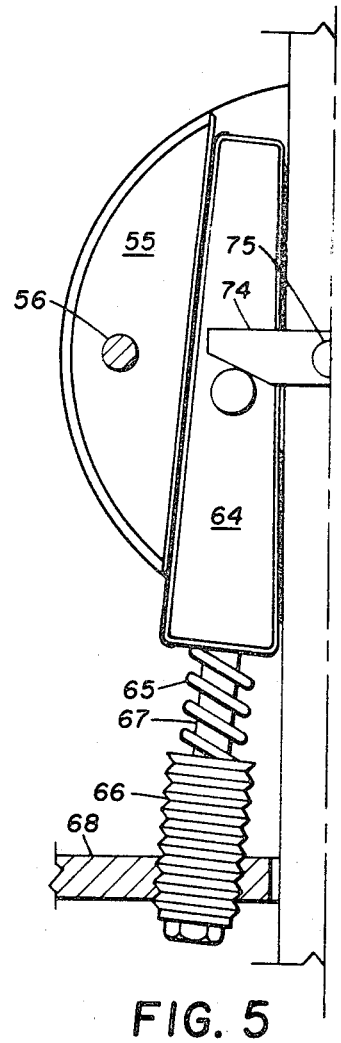
FIG. 5 is a view similar to FIG. 4 illustrating the brake shoes in brake closed relation.
Figure 7:
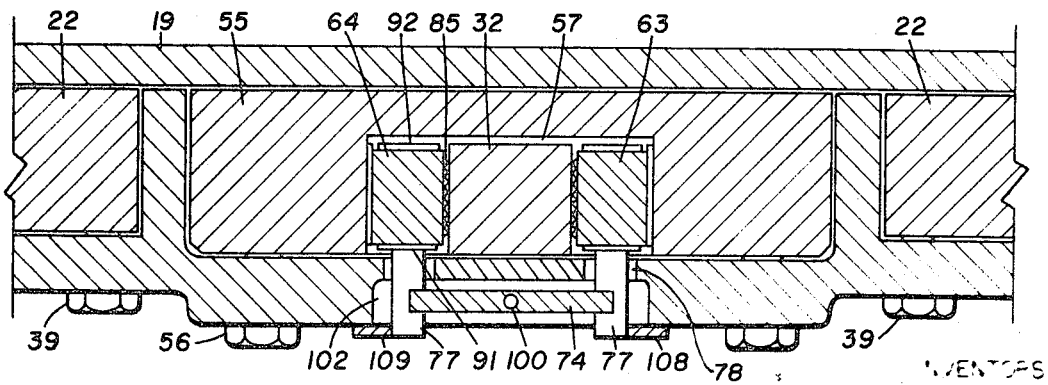
FIG. 7 is a sectional view taken substantially along the lines 7—7 of FIG. 4.

The brake shoes in accordance herewith are constructed as most clearly illustrated in FIGS. 4–6. Each shoe consists of a central wedged or taper-shaped base section 82 mill recessed at 83 and 84 along its inside face 85. Received and secured within each of the latter recesses is a section of standard double cut bastard mill file 86 and 87 arranged with its cutting teeth forward and facing in a downward direction. Attached to each base side face 89 and 90 is a thin sheet 91 of a substantially frictionless material marketed commercially under the trademark Teflon. Rear face 92 is similarly jacketed with a frictionless sheet 94 whereby the shoes when subject to vertical movement for braking and debraking will not bind against the adjacently contiguous surfaces of body 38 and brake holder 55. Secured extending laterally outward from face 89, for reasons as will be described, is a pin 77.

Acting to urge the shoes downward to hold the brake open in debraking relation in opposition to the exerted force of springs 65 is an actuator assembly 93, which may be of a type disclosed in the aforementioned cofiled application for "Centrifugal Actuator." In its normal mode, the actuator maintains the shoes disengaged from bar 32 by acting through a cross rod 96 to depress push rod assembly 76. Cross bar 74 is attached to the push rod assembly by pin 75 and via its chamfered ends engages shoe pins 77 extending outward of inclined body slots 78.

Actuator 93 is responsive to any sudden velocity changes between fixed mast section 19 and intermediate mast section 22 which would represent failure in their normal intersupport as an emergency requiring brake 10 hereof to be actuated. It is suffice to say for purposes of understanding the instant invention that actuator 93 is normally superposed over hingedly supported trip arm 96 maintained in a horizontal position as shown solid in FIG. 2. In response to the encountered velocity increase representing an emergency condition under which the brake is to be engaged, the actuator is effective to permit trip arm 96 to move angularly upward to the position shown dashed in FIG. 2.

With trip arm 96 in its normal horizontal relation its undersurface engageably depresses roller 97 representing the uppermost portion of push rod assembly 76. The roller is rotatably supported on a pin 98 in turn secured in a cleavised rod 99 threadedly connected to a push rod 100. The push rod extends vertically downward through body bore 101, which is interrupted by a central cavity 102, and at its lower extremity is of reduced dimension for receiving pin 75 on which cross bar 74 is secured. A spring 104 coiled about rod 100 is compressed between the top surface of body 38 and the undersurface of a washer 105 fixedly secured to push rod 100 and acts to bias the push rod assembly 76 in an upward direction. Also secured to push rod 100 is a laterally extending bracket 106 maintained in engagement with a limit switch 107 whereby to effectively disconnect power to the operating equipment at the time brake actuation is initiated.

On release of trip arm 96 in response to excess velocity increase to the dashed position of FIG. 2 push rod 99 acting through cross bar 74 to force brake shoes 63 and 64 downward is concomitantly released whereby the entire push rod assembly 76 is urged upwardly by the action of spring 104 to the position also shown dashed in FIG. 2. When this occurs the downward force against spring 65 is relieved and the springs 65 immediately force the shoes linearly upward until the file teeth brakingly grip bar 32. A pair of vertically inclined shims 108 and 109 secured to the face of body 38 and positioned along slots 78 contiguous to each of pins 77 accurately guide the brake shoes when moving between braking and debraking positions.

As can be appreciated, the precise distance through which push rod assembly 76 is required to travel for shoe positioning between brake engagement and disengagement can vary to meet the circumstances and operative dimensions of associated components. In accordance herewith this distance can be presettably adjusted by threading rod 99 into push rod 100 to the desired linear separation thereby controlling the effective length of push rod assembly 76.

In operation, the brake shoes are normally maintained spaced apart in debraking relation disengaged from gripping bar 32 by means of actuator trip bar 96. In this relation the bar depresses push actuatable rod assembly 76 forcing cross bar 74 downward against shoe pins 77. At the same time, acting in opposition to the trip bar are coil springs 104 tending to urge the push rod assembly upward and coil springs 65 tending to urge each shoe upward into braking relation with gripping bar 32. When an emergency arises requiring the safety brake to brake or arrest the falling component, actuator 93 sensing the condition, releases arm 96 permitting the push rod assembly 76 to be actuated and immediately move upward in follower engagement by the action of compressed spring 104. Concomitant with upward movement of the push rod assembly each spring 65 acts independently on its respective brake shoe urging it upward into wedging engagement between the gripping bar 32 and the side walls of passage 57. As a consequence of the wedging action with mast 22 in a rapid descent, the brake teeth of file sections 86 and 87 bite into bar 32 immediately arresting further movement of the mast. This therefore places the entire load onto bar member 32 until corrective action can be taken to remedy the condition which prompted actuation of the brake.

By the above description there has been disclosed a novel safety brake for use in conjunction with elevating structures and which is both simple and reliably effective as to not be subject to the abuse and maintenance requirements formerly associated with similar purpose devices of the prior art. Since bar 32 is resiliently mounted while retaining a degree of lateral float, it provides a shock absorbing unit able to cushion the impact of sudden braking. Once the failure condition has been remedied the brake can be reset by hoisting the intermediate mast until release of the brake shoe is effected and then resetting trip arm 96. The entire unit is then in a readiness condition until the next emergency arises.

Since many changes could be made in the above construction and many apparently widely different embodiments of this invention could be made without departing from the scope thereof, it is intended that all matter contained in the drawings and specifications shall be interpreted as illustrative and not in a limiting sense.

The embodiments of the invention in which an exclusive property or privilege is claimed are defined as follows:

1. A stacker crane safety brake operable in the event of a support failure between relatively movable contiguous components of the crane mast comprising:
    a. actuatable means operably actuated in response to a support failure;
    b. a braking surface provided by a vertically extending member supported on one of said components;
    c. a braking unit secured to the other of said components and operable to effect braking engagement with said braking surface concomitantly with the operable actuation of said actuatable means;
    d. said braking unit including brake shoes and means maintaining said shoes in a first position displaced from braking engagement with said braking surface in the absence of a response by said actuatable means, means operable to effect a substantially linear shoe movement into a second position in a movement arrest braking engagement with said braking surface on occurrence of a response by said actuatable means and support means laterally surrounding said shoes in said second position to control dissipation of the arresting forces imposed by said braking engagement; and
    e. adjustment means including a push rod having a threaded connection presettable for varying the movement distance between said first and second brake shoe positions.

2. A safety brake according to claim 1 in which said braking surface is provided by a vertical bar member, said shoes are arranged vertical and are tapered to a reduced dimension from their bottom toward their top, and there is included means operable when braking into said second position to wedgingly force said shoes substantially linearly into braking engagement with said bar.

3. A safety brake according to claim 2 in which said vertical bar member is floatingly connected to the component on which it is supported.

4. A safety brake according to claim 2 in which said brake shoes and bar member are generally always relatively positioned in the same vertical plane throughout engagement and disengagement therebetween.

5. A safety brake according to claim 2 in which said shoes each include toothed gripping surfaces facing the braking surface of said bar member for effecting a braking relation on engagement therebetween.

6. A safety brake according to claim 2 in which said braking unit support means includes a brake shoe holder fixedly secured thereto, said brake shoe holder having walls defining a central vertically extending cavity through which to receive said vertical bar member and there is means supporting said brake shoes within said cavity between the defining walls thereof and said bar member.

7. A safety brake according to claim 6 in which said actuatable means comprises said push rod vertically movable and operably engaging said brake shoes acting to maintain said shoes in said first position in the absence of a support failure response and movable to release said brake shoes for brake engagement on occurrence of a support failure response.

8. A safety brake according to claim 7 in which said shoes each include toothed gripping surfaces facing the braking surface of said bar member for effecting a braking relation on engagement therebetween.

9. A safety brake according to claim 8 in which said push rod actuatable means is operatively connected to a remote actuator apparatus sensitive to a support failure between said contiguous components for actuating said push rod.

10. A safety brake according to claim 8 including biasing means urging said shoes into braking engagement with the braking surface of said bar and offset by said push rod assembly in the absence of a response by said actuator.

11. A safety brake according to claim 10 in which at least some surfaces of said brake shoes other than the gripping surfaces thereof include a frictionless material thereon.

12. A safety brake operable in the event of a support failure between relatively movable contiguous components of an elevating device comprising:
  a. a braking surface provided by a vertically extending bar member supported on one of said components; and
  b. a braking unit secured to the other of said components and operable to effect braking engagement with said bar member; said braking unit including:
   1. vertically arranged brake shoes tapered to a reduced dimension from their bottom toward their top and having toothed gripping surfaces facing the braking surface of said bar member for effecting a braking relation on engagement therewith;
   2. a fixedly secured brake shoe holder having walls defining a central vertically extending cavity through which to receive said vertical bar member and including means supporting said brake shoes within said cavity between the defining walls thereof and said bar member; and
   3. means maintaining said shoes in a first position displaced from braking engagement with said braking surface in the absence of a said support failure;
   4. biasing means urging said shoes from said first to said second positions and operable to wedgingly force said shoes in a substantially linear movement into a second position in braking engagement with said bar member on occurrence of a said support failure, and
   5. a pin laterally extending outward from each of said shoes; and
  c. actuatable means operably actuated in response to a support failure for concomitantly effecting said movement of said shoes from said first to said second positions and comprising a vertically moveable push rod including a cross bar secured thereto operably engaging the pins on said brake shoes acting to offset said biasing means and maintain said shoes in said first position in the absence of a support failure and movable to release said brake shoes for brake engagement on occurrence of a support failure.

13. A safety brake according to claim 12 including shim means supported contiguous to said pins for guiding movement thereof between the first and second positions of said shoes.

14. A safety brake according to claim 12 in which said bar member is supported on a first mast section of a stacker crane and said braking unit is supported on a second mast section of the stacker crane contiguous to said first section.

15. A safety brake according to claim 12 in which the elevating device comprises a stacker crane having a mast including said movable contiguous components, said braking engagement being effective for a movement arrest with the shoes in said second position and there is included support means laterally surrounding said shoes in said second position to control dissipation of the arresting forces imposed by said braking engagement.

16. A safety brake according to claim 15 including shim means supported contiguous to said pins for guiding movement thereof between the first and second positions of said shoes.

17. A safety brake according to claim 15 in which said bar member is supported on a first mast section of a stacker crane and said braking unit is supported on a second mast section of the stacker crane contiguous to said first section.

* * * * *